W. H. Start.
Harvester Droppers.
Nº 8182. Patented Jun. 24, 1851

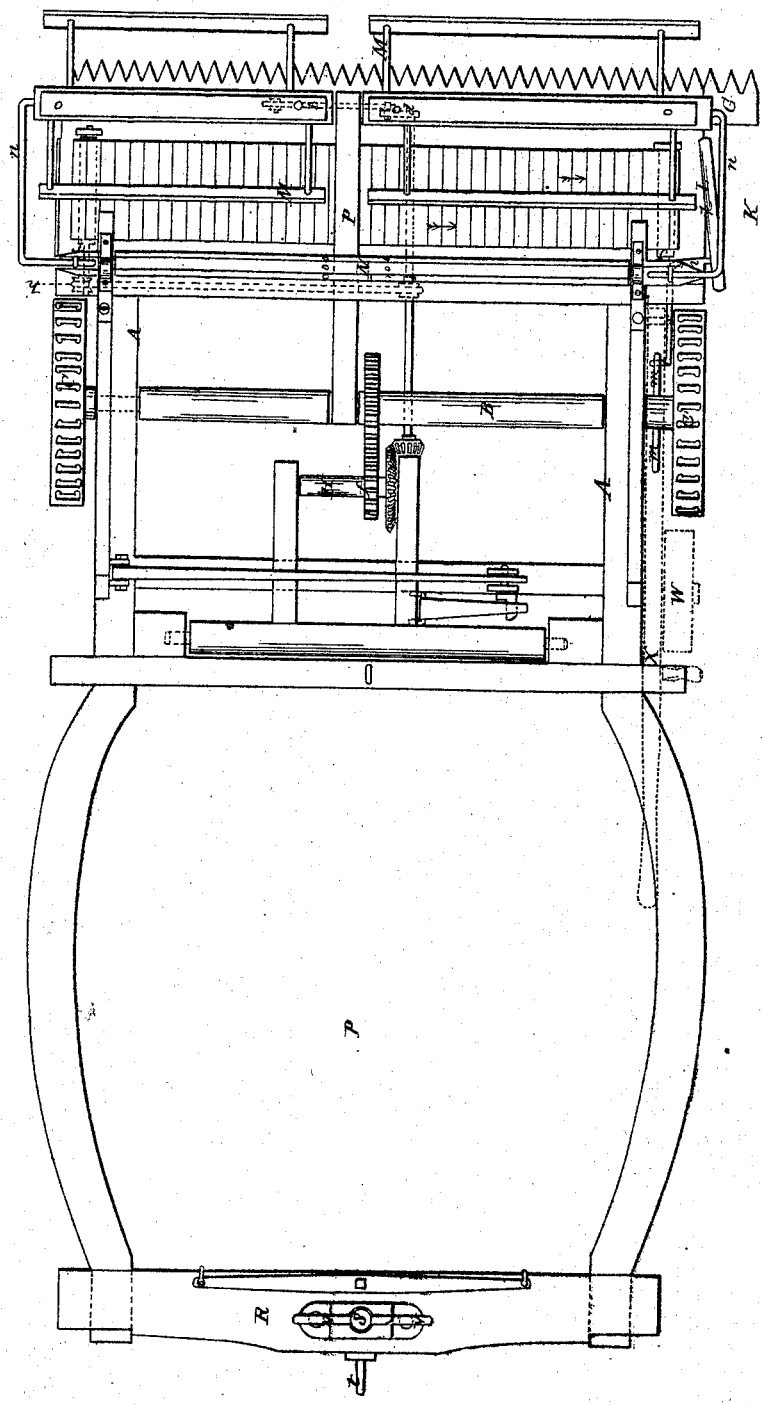

UNITED STATES PATENT OFFICE.

WILLIAM H. START, OF SMYRNA, DELAWARE.

IMPROVEMENT IN GRAIN-HARVESTERS.

Specification forming part of Letters Patent No. 8,182, dated June 24, 1851.

*To all whom it may concern:*

Be it known that I, WILLIAM H. START, of Smyrna, in the county of Kent and State of Delaware, have invented certain new and useful Improvements in Machines for Cutting Grain and Grass; and I do hereby declare that the following is a full, clear, and exact description of my invention, reference being had to the accompanying drawings, which form part of this specification, and in which—

Figure 1:
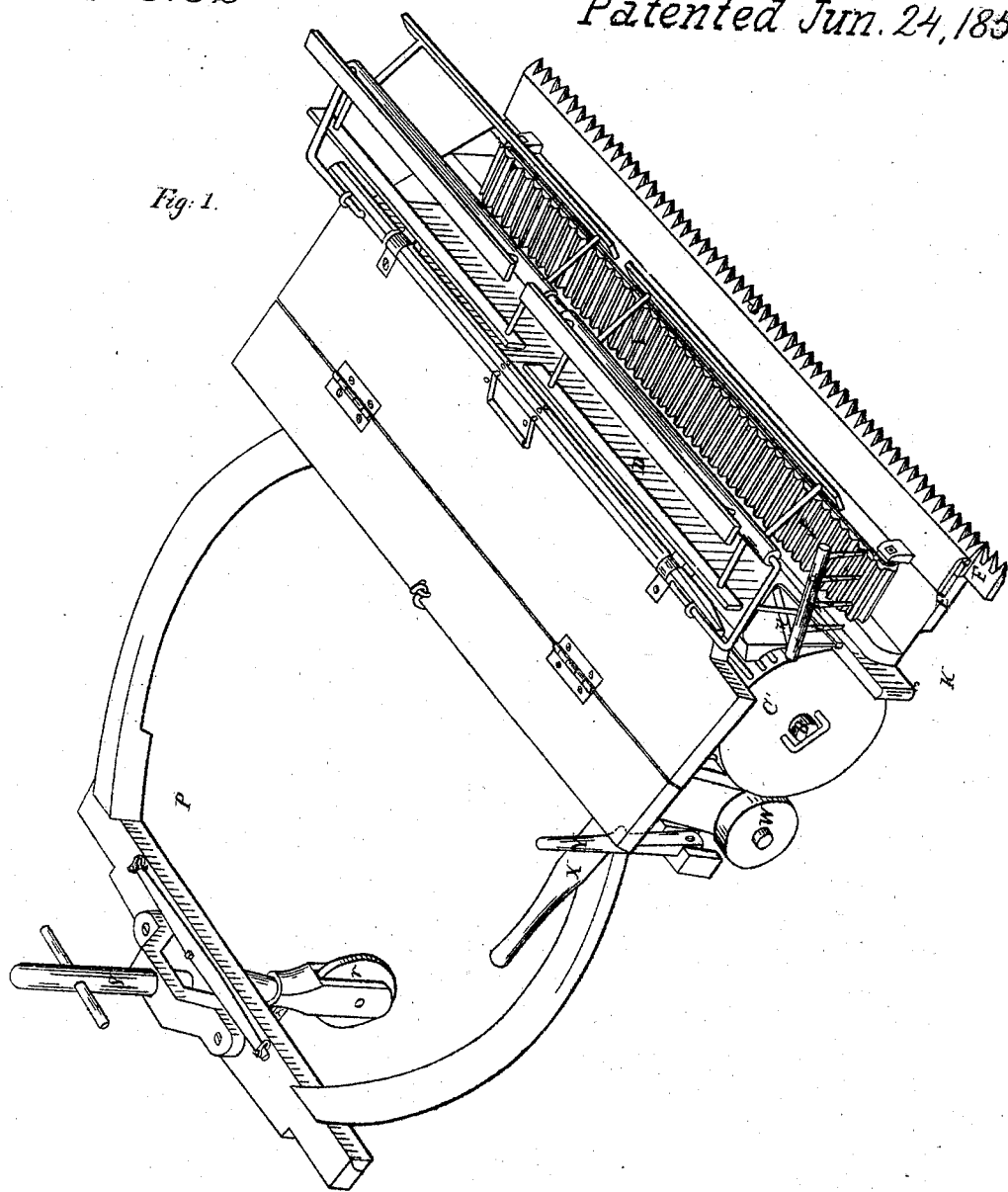
Figure 3:
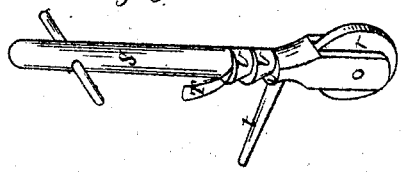

Figure 1 represents a view in perspective of my grain and grass cutter. Fig. 2 is a plan of the same, with certain portions removed to show its construction; and Fig. 3 is a view in perspective of the steering apparatus detached from the machine.

In my machine the grain is cut by a reciprocating toothed cutter, and is thrown down as fast as cut upon an endless moving belt by a reel whose shaft can be adjusted to the height of the grain. The belt conveys the grain as fast as cut to one side of the machine, whence it is allowed to fall at suitable intervals by a gate which is raised for the purpose. The team by which the machine is moved are hitched behind it to the hinder bar of a frame within which they walk. This hinder bar is supported by a wheel which is turned to steer the machine, and is set at a greater or less distance beneath the bar to raise the hinder part of the machine, and thereby to lower the cutter, which is at the front of the machine, correspondingly nearer the ground.

In the accompanying drawings, A A is a strong frame, to which the other portions of the machine are attached. It rests upon the axle B of a pair of running-wheels, of which one, C, is made fast to the axle, while the other, C', is free to turn upon it. The front rail, E, of the frame projects sufficiently in front of the axle to allow the grain cut to fall between the cutting apparatus and a fence, D, in front of the running-wheels. This bar supports the cutting apparatus, which consists of two members, the lower, F, being stationary and secured to the bar E, while the upper, G, is made to move to and fro above the lower. Each of these members consists of a toothed blade, which, as the machine is advanced into the standing grain, receives the latter between its teeth and severs it. The upper cutter is moved to and fro by means of a crank, $a$, (dotted in Fig. 2,) with which it is connected by a connecting-rod $b$. The crank is secured to the front extremity of a shaft, $c$, which extends toward the back of the machine and is fitted at its hinder extremity with a beveled pinion, $d$, which gears into a beveled wheel, $e$, on a short shaft, H, parallel with the axle B. This shaft is fitted with a pinion, $f$, which gears into a wheel, $g$, secured to the axle B, so that as the latter is turned by the revolution of the fast running-wheel C in rolling over the round the crank-shaft is made to revolve and the cutter to move to and fro. In order to increase the adhesion of the running-wheels upon the ground, their surface may be fitted with cleats or protuberances, which will insure their turning.

Immediately behind the cutter is the endless band I, on which the cut grain falls. This band is supported on two rollers or prisms, J J', one of which is made to revolve by a belt, $h$, which encircles a belt-pulley on its shaft and a corresponding one on the crank-shaft $c$. By the motion thus imparted to it the upper member of the band is forced to move in the direction indicated by the arrows in the drawings, by which means the cut grain is conveyed to the side K of the machine, and is heaped against a gate. The latter consists of a series of teeth, $i$ $i$, which are secured to a common head, $k$. The gate thus formed is secured to the front end of a bent lever, $l$, which is pivoted to the frame of the machine, its hinder end extending toward the axle B, which at this point is furnished with pins $m$. These as the axle revolves strike the hinder extremity of the bent lever, which is thus depressed, while its front extremity, with the rake L attached thereto, is correspondingly raised to allow the grain heaped against it to drop at that side of the machine.

In order to lay the grain evenly upon the endless band I, and to facilitate the action of the cutter, a reel, M, is constructed to revolve above the cutting apparatus. The shaft of this reel is supported at each extremity by an arm, $n$. The two arms are projected from a common shaft, N, by turning which the shaft of the reel can be raised or depressed, thus adjusting it to the height of the grain.

The reel M is secured in any desired position by means of a hook, $o$, which engages in holes made in the periphery of the shaft N, and locks it in its position. The reel is put in motion by a belt, $p$, which encircles belt-pulleys secured to its shaft and to the axle B of the running-wheels.

The machine is advanced by a team which is hitched within a frame, P, projected from the hinder part of the main frame. This frame consists of two side bars, which are connected at their hinder extremities by a hitching-bar, R. The latter is parallel with the axle of the running-wheels, and supports the set of whiffle-trees with which the traces are connected. This hitching-bar is supported by a round standard, S, whose lower extremity is furnished with a wheel, r. The standard is fitted at its hinder part with a steering bar or tiller, t, by means of which it may be turned to turn the wheel r, and thus change the direction in which the machine is moving. The standard is fitted with a series of protuberances, u, one of which bears against a curved block, T, on the lower face of the hitching-bar. These protuberances extend only partially round the standard, its front side being an unbroken cylindrical surface. When the hinder part of the machine is to be raised or depressed the standard is turned half-way around, so that its cylindrical side may be brought in contact with the curved block. The hinder part of the frame can then be moved up or down on the standard, and it can be locked in its position by turning the standard back to its original position, when the bottom of the curved block T will bear against the upper face of a different one of the protuberances u. As it is frequently convenient to mount the driver upon the machine, the upper part of the standard S is fitted with a cross-bar, v, by means of which he can turn it to guide the machine.

By this method of hitching the team within a frame they are enabled to walk much more freely while the machine is moving in a curve than they would if harnessed to a tongue, which, projecting between them, greatly impedes their free movement in turning curves. To facilitate the turning of the machine when both the running-wheels C C' are made fast to their axle B, I apply a supplementary wheel to one side of the machine. This wheel W is pivoted to a standard which can be raised or depressed by a lever, X. When the lever is depressed the supplementary wheel is brought in contact with the ground, and that side of the machine is raised sufficiently to shift the running-wheel C' from the ground. The machine is then supported on two wheels which are independent of each other, and can therefore be turned with the same facility of an ordinary carriage, while it has the advantage of two driving-wheels when performing its work. The lever X is fixed in its depressed position by means of a hook-lever, Y, pivoted to that side of the main frame.

The machine is well adapted for cutting both grain and grass, which is discharged at suitable intervals in heaps at the side of the machine, where the grain can be bound into sheaves with great facility, as it is already gathered into heaps of a suitable size.

If it be deemed preferable when cutting grass to leave it as much scattered as possible, the rake L may be raised and secured in its raised position by inserting a pin beneath the front arm of the bent lever l. The grass cut will then be delivered in a continuous manner by the endless band.

Having thus described my improved grain and grass cutter, what I claim as my invention, and desire to secure by Letters Patent, is—

1. The standard to which the steering-wheel is attached, constructed, as herein described, so as to perform its own office proper and also adjust the cutter at the required height above the surface of the ground.

2. The discharging-rake which is moved, as described, in combination with the endless apron for collecting and discharging the cut grain, as set forth.

In testimony whereof I have hereunto subscribed my name.

WILLIAM H. START.

Witnesses:
GEO. DAVIS,
D. LOCKWOOD.